United States Patent
Choi et al.

(10) Patent No.: US 9,939,844 B2
(45) Date of Patent: Apr. 10, 2018

(54) ELECTRONIC DEVICE WITH CURVED DISPLAY MODULE AND OPERATING METHOD THEREOF

(71) Applicant: Samsung Electronics Co., Ltd., Gyeonggi-do (KR)

(72) Inventors: Jong-Chul Choi, Gyeonggi-do (KR); Hyung-Jin Park, Gyeonggi-do (KR); Chan-Keun Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 14/539,837

(22) Filed: Nov. 12, 2014

(65) Prior Publication Data

US 2015/0160699 A1    Jun. 11, 2015

(30) Foreign Application Priority Data

Dec. 5, 2013 (KR) .................. 10-2013-0150705

(51) Int. Cl.
G06F 1/16 (2006.01)
H04M 1/02 (2006.01)
H04M 1/23 (2006.01)

(52) U.S. Cl.
CPC .......... *G06F 1/1643* (2013.01); *G06F 1/1652* (2013.01); *G06F 1/1656* (2013.01); *H04M 1/0266* (2013.01); *G06F 2200/1636* (2013.01); *H04M 1/027* (2013.01); *H04M 1/236* (2013.01); *H04M 2250/22* (2013.01); *Y10T 29/49002* (2015.01)

(58) Field of Classification Search
CPC .... G06F 1/1643; G06F 1/1656; G06F 1/1652; G06F 2200/1636; G06F 3/041; G06F 3/044; H04M 1/0266; H04M 2250/22; H04M 1/027; H04M 1/236; Y10T 29/49002

See application file for complete search history.

(56) References Cited

U.S. PATENT DOCUMENTS

| | | | |
|---|---|---|---|
| 2006/0132027 A1* | 6/2006 | Gao | H01L 51/0097 313/506 |
| 2012/0154293 A1* | 6/2012 | Hinckley | G06F 1/1694 345/173 |
| 2013/0002583 A1* | 1/2013 | Jin | G06F 1/1637 345/173 |
| 2013/0033434 A1 | 2/2013 | Richardson et al. | |
| 2013/0076612 A1* | 3/2013 | Myers | G06F 1/1626 345/156 |
| 2013/0300668 A1* | 11/2013 | Churikov | G06F 3/041 345/168 |
| 2014/0253477 A1* | 9/2014 | Shim | G06F 3/0416 345/173 |

* cited by examiner

*Primary Examiner* — Ibrahim A Khan

(57) ABSTRACT

An electronic device includes a flexible display module including a curvature, and a bracket supporting the flexible display module, wherein the bracket includes at least a part formed with a curvature corresponding to the curvature of the flexible display module.

17 Claims, 16 Drawing Sheets

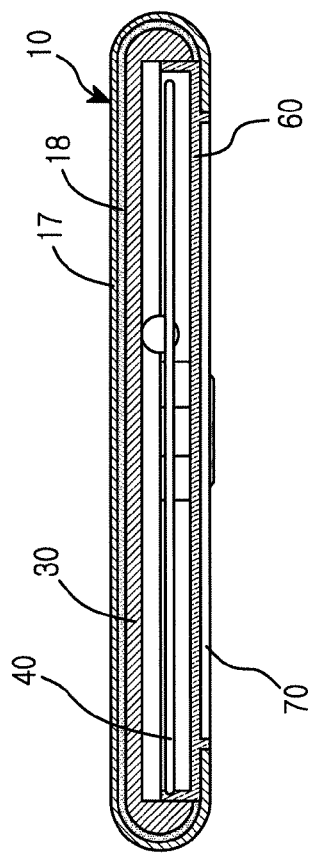
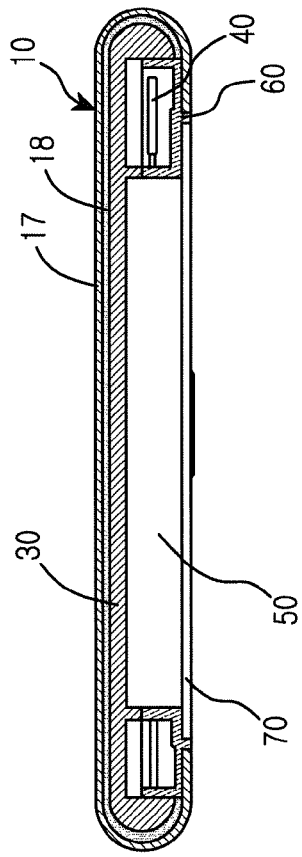
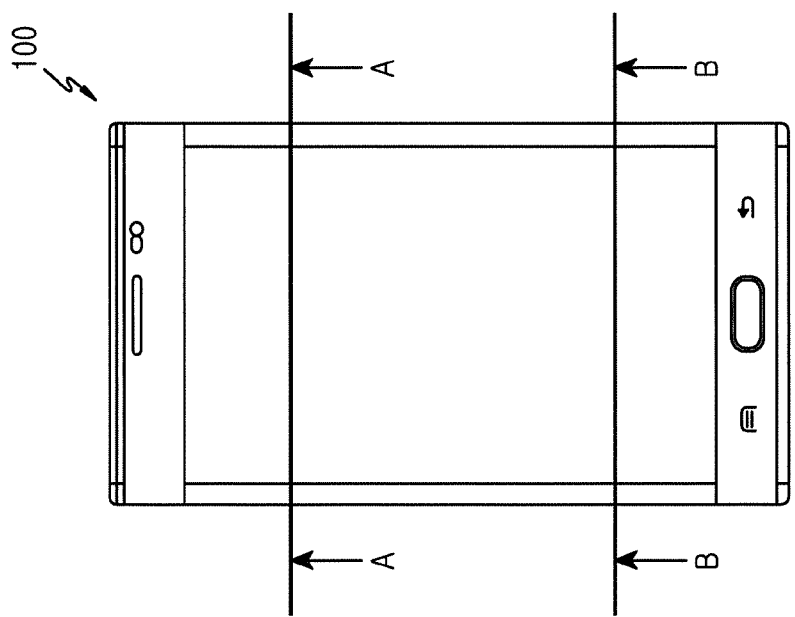
FIG.5B
FIG.5C
FIG.5A

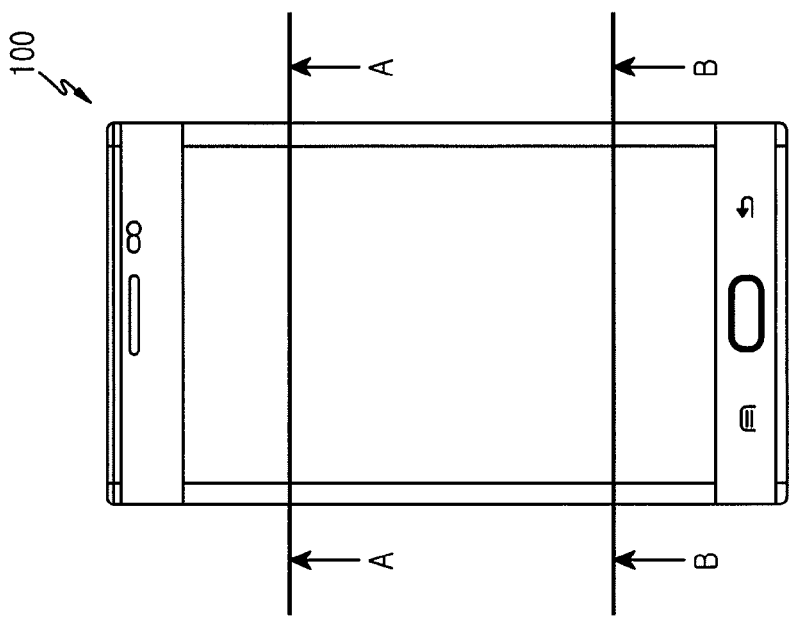
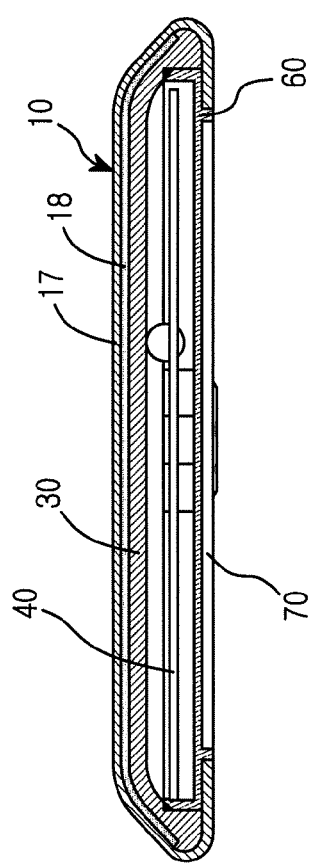
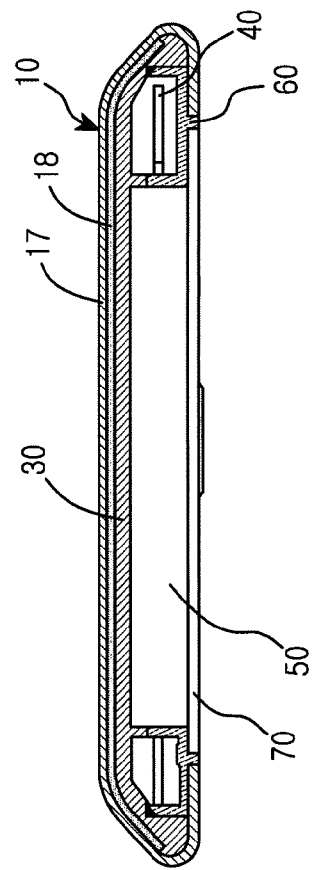

ELECTRONIC DEVICE WITH CURVED DISPLAY MODULE AND OPERATING METHOD THEREOF

PRIORITY

The present application is related to and claims priority under 35 U.S.C. § 119(a) to a Korean Patent Application filed in the Korean Intellectual Property Office on Dec. 5, 2013 and assigned Serial No. 10-2013-0150705, the entire disclosure of which is incorporated herein by reference.

TECHNICAL FIELD

The present disclosure relates to an electronic device with a curved display module and an operating method thereof.

BACKGROUND

Electronic devices include touch screens and display modules. The electronic devices have one or more camera modules as well as a telecommunication function, so they can take a still picture and a video. Also, the electronic devices can play back multimedia contents such as music, a video and the like, and can also access a network and perform web surfing.

Meantime, the electronic devices can have higher competitive power as getting diverse in function and getting advantageous in portability. A user is likely to prefer an electronic device which has a slimmer and better appearance and has excellent portability and grip sense. Accordingly, electronic device manufacturers are endeavoring to develop an electronic device having a slimmer, lightweight and simple appearance and having excellent grip sense and portability.

SUMMARY

To address the above-discussed deficiencies, it is a primary object to provide an electronic device with a curved display module providing an excellent acknowledgement quality and grip sense, and an operating method thereof.

In a first example, an electronic device is provided. The electronic device includes a curved display module providing an intuitive user interface using a side surface and rear surface of the electronic device.

In a second example, a method is provided. The method includes providing an intuitive user interface using a side surface and rear surface of an electronic device.

In a third example, an electronic device is provided. The electronic device includes a curved display module executing a corresponding function in accordance with a state of holding the electronic device.

In a fourth example, a method is provided. The method includes executing a corresponding function using a curved display module of an electronic device in accordance with a state of holding the electronic device.

In a fifth example, an electronic device is provided. The electronic device includes a flexible display module including a curvature, and a bracket supporting the flexible display module including at least a part formed to have a curvature corresponding to the curvature of the flexible display module. At least a part of the flexible display module is installed to be supported by the bracket.

In a fifth example, the flexible display module is constructed by a window of flexible material and a flexible display laminated on the window.

In a sixth example, a touch panel is interposed between the window and the flexible display.

In a seventh example, the window is formed wider than the flexible display.

In an eighth example, the flexible display module is constructed so that the flexible display module surrounds at least a part of a side surface of the electronic device.

In a ninth example, the flexible display module is constructed so that the flexible display module surrounds a part of at least a rear surface and a side surface of the electronic device.

In a tenth example, the bracket is formed of at least one of metal material and plastic material.

In an eleventh example, at least one surface of a front surface, a side surface, and a rear surface of the electronic device is formed in a slant shape.

In a twelfth example, the flexible display module is coupled with the bracket to provide an internal housing space housing a plurality of electronic components.

In a thirteen example, a method for assembling an electronic device is provided. The method includes the processes of forming at least one side surface of a flexible display module such that the at least one side surface has a curvature. The method also includes electrically connecting the flexible display module to a body part. The method further includes fixing the one side surface of the flexible display module having the curvature to a first position of the body part. The method includes fixing the other side surface of the flexible display module to a second position of the body part using a recoverable stress.

In a fourteenth example, electrically connecting the flexible display module to the body part includes coupling a connector extended from the flexible display module in one direction with a part of a substrate of the body part.

In a fifteenth example, the connector is formed as a Flexible Printed Circuit Board (FPCB).

In a sixteenth example, a method of operating an electronic device having a display module extended to a side surface of the electronic device or a rear surface of the electronic device through the side surface can be provided. The method includes detecting a touch to at least one surface among the side surface and rear surface of the electronic device. The method also includes deactivating a function of at least a part of the side surface and rear surface of the electronic device. The method further includes based on the detected touch, deciding if the electronic device rotates by a reference angle. The method includes if the electronic device rotates by the reference angle, displaying additional information on at least a part of the side surface of the electronic device.

In a seventeenth example, the additional information includes at least one of additional function information, attribute information, and setting information about an object displayed on a front surface of the electronic device.

In an eighteenth example, the method includes detecting a touch event to at least one surface among a side surface and rear surface of the electronic device. The method also includes performing at least one function corresponding to the detected touch event.

In a nineteenth example, the at least one function corresponding to the touch event includes at least one of a function of increasing or decreasing a sound volume of the electronic device, a function of zooming in or zooming out at a constant rate an object displayed on a screen, a function of canceling or again performing the latest executed instruction, a function of scrolling for quick screen conversion, and a function of executing a specific application.

In a twentieth example, an electronic device is provided. The electronic device includes a display module configured to extend to a side surface of the electronic device or a rear surface of the electronic device through the side surface. The electronic device also includes a memory. The electronic device further includes at least one processor. The processor is configured to detect a touch to at least one surface among the side surface and rear surface of the electronic device. The processor is also configured to deactivate a function of at least a part of the side surface and rear surface of the electronic device. The processor is further configured to based on the detected touch, decide if the electronic device rotates by a reference angle. The processor is configured to if the electronic device rotates by the reference angle, display additional information on at least a part of the side surface of the electronic device.

In a twenty-first example, the additional information includes at least one of additional function information, attribute information, and setting information about an object displayed on a front surface of the electronic device.

In a twenty-second example, the processor is configured to detect a touch event to at least one surface among a side surface and rear surface of the electronic device. The electronic device is also configured to perform at least one function corresponding to the detected touch event.

In a twenty-third example, the processor is configured to perform corresponding to the touch event at least one function among a function of increasing or decreasing a sound volume of the electronic device. The processor is also configured to perform a function of zooming in or zooming out at a constant rate an object displayed on a screen. The processor is further configured to perform a function of canceling or again performing the latest executed instruction. The processor is configured to perform a function of scrolling for quick screen conversion. The processor is also configured to perform a function of executing a specific application.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A through 5C illustrates a cross section of an example electronic device according to this disclosure;

FIGS. 6A through 6C illustrate a cross section of an example electronic device according to this disclosure;

DETAILED DESCRIPTION

Figure 1:
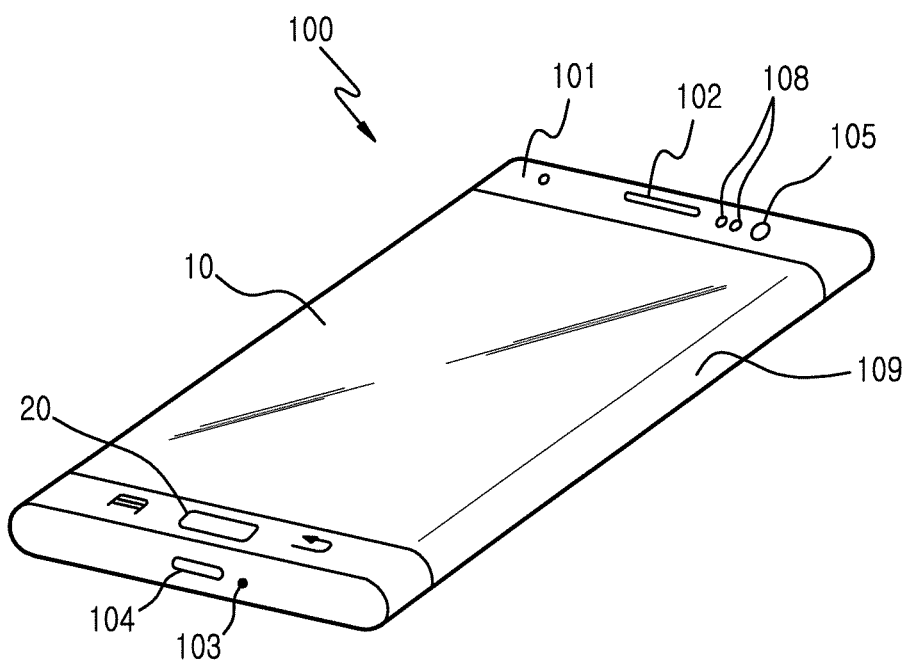
FIG. 1 is a front perspective diagram illustrating an example electronic device according to this disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Various exemplary embodiments of the present disclosure will be described herein below with reference to the accompanying drawings. In describing exemplary embodiments of the present disclosure, well-known functions or constructions are not described in detail since they would obscure the disclosure in unnecessary detail. And, the terms described below, which are defined considering functions in the present disclosure, can be modified in accordance to user and operator's intention or practice. Therefore, the definition should be given on the basis of the content throughout the present specification.

Various exemplary embodiments of the present disclosure can make various modifications and can have various exemplary embodiments. Specific exemplary embodiments will be exemplified in the drawings and will be described in detail in a detailed description. But, these do not intend to limit the present disclosure to a specific embodiment form, and should be understood as including all changes, equivalents or substitutes included in the spirit and technical scope of the present disclosure.

The terms including ordinal numbers such as $1^{st}$, $2^{nd}$, and the like can be used to describe various constituent elements, but the terms do not intend to limit the constituent elements. The terms are used only for the purpose of distinguishing one constituent element from other constituent elements. For instance, a $2^{nd}$ constituent element can be named as a $1^{st}$ constituent element without departing from the right scope of the present disclosure. Likely, even the constituent element can be named as the $2^{nd}$ constituent element.

When it is mentioned that any constituent element is 'connected' or 'accessed' to another constituent element, it should be understood that the any constituent element can be directly connected or accessed to another constituent element or the third constituent element can exist between the two constituent elements. In contrast, when it is mentioned that any constituent element is 'directly connected' or 'directly accessed' to another constituent element, it should be understood that the third constituent element does not exist between the two constituent elements.

The terms used in the present exemplary embodiment are used for just merely describing specific exemplary embodiments, and do not intend to limit an exemplary embodiment of the present disclosure. The expression of singular number includes the expression of plural number unless the context clearly dictates otherwise. In an exemplary embodiment of the present disclosure, it should be understood that the terms of 'comprise', 'include', 'have', and the like are to indicate the existence of a feature stated in the specification, a number, a step, an operation, a constituent element, a part, or a combination of them, and do not previously exclude a possibility of existence or supplement of one or more other features, numbers, steps, operations, constituent elements, parts, or combinations of them.

In describing exemplary embodiments of the present disclosure, a display module can be also called a display, and a Liquid Crystal Display (LCD) module or an Active-Matrix Organic Light-Emitting Diode (AMOLED) for just outputting inputted data. But, it is not limited to this, and the display module of exemplary embodiments of the present disclosure can be a touch screen device capable of performing in one physical screen an input operation using an input device and a display operation using the display. The display module can be arranged on a front surface of an electronic device and can be a concept including a window installed at a top but having a curvature corresponding to the display module.

The display module is curvedly formed to have a curvature. The display module i a flexible display module. The display module is formed of plastic material having the property of bending such as a film. The display module is a flexible Organic Light-Emitting Diode (OLED).

An electronic device is an electronic device of which only a side surface is curvedly formed to have a curvature and a front surface and a rear surface are formed as planes. But, it is not limited to this, and the electronic device can apply a display module in which the front surface and rear surface of the electronic device are curvedly formed as well. A curvature of the display module arranged on the side surface of the electronic device and a curvature of a side surface of a bracket supporting the display module can be equal to each other. But, it is not limited to this, and the curvature of the display module arranged on the side surface of the electronic device and the curvature of the side surface of the bracket can be also different from each other.

An electronic device capable of applying a display module as a display unit is illustrated and described, but it is not limited to this. For example, the electronic device includes one or more of a smart phone including a display module having a curvature, a tablet Personal Computer (PC), a mobile phone, a video phone, an electronic book (e-book) reader, a desktop PC, a laptop PC, a netbook computer, a Personal Digital Assistant (PDA), a Portable Media Player (PMP), an MPEG Audio Layer 3 (MP3) player, an accessory, an electronic appcessory, a camera, a wearable device, a wrist watch, a refrigerator, an air conditioner, a cleaner, an artificial intelligence robot, a TV, a Digital Video Disk (DVD) player, an audio system, an oven, a microwave, a washing machine, an electronic bracelet, an electronic necklace, an air cleaner, an electronic frame, a medical instrument, a navigation device, a satellite signal receiver, an Event Data Recorder (EDR), a Flight Data Recorder (FDR), a set-top box, a TV box, an electronic dictionary, a car infotainment device, an electronic equipment for ship, avionics, a security instrument, electronic clothes, an electronic locking system, a camcorder, a game console, a Head-Mounted Display (HMD), a flat panel display device, an electronic album, a part of furniture or building/structure including an electronic device, an electronic board, an electronic signature receiving device, and a projector.

Figure 2:
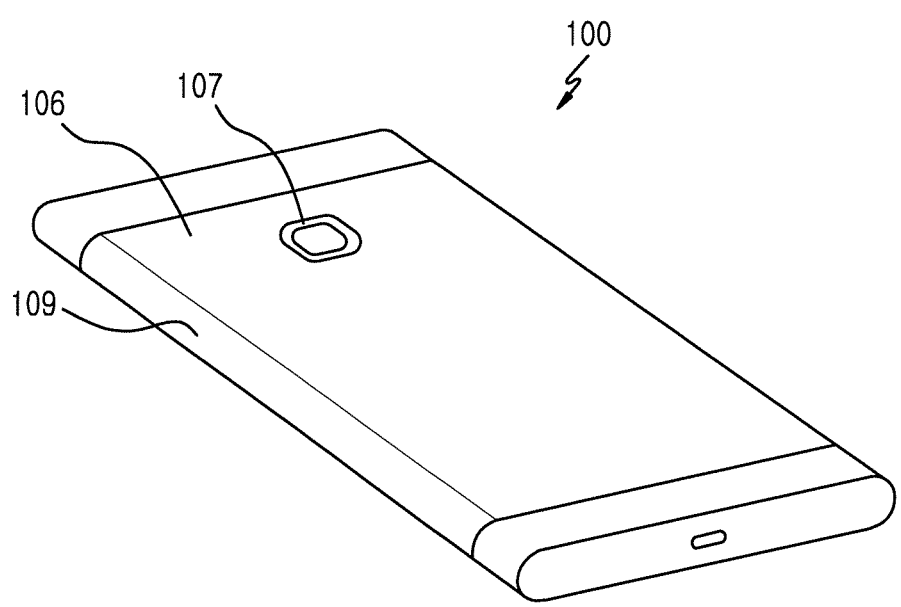
FIG. 2 is a rear perspective diagram illustrating an example electronic device according to this disclosure.

FIG. 1 is a front perspective diagram illustrating an example electronic device 100 according to this disclosure. FIG. 2 is a rear perspective diagram of an electronic device 100 according to this disclosure.

Referring to FIGS. 1 and 2, a display module 10 is installed on a front surface 101 of the electronic device 100. A speaker 102 for receiving a counterpart's voice is installed at an upper side of the display module 10, and a microphone 103 for transmitting a voice to a counterpart is installed at a lower side of the display module 10 thereby being able to perform a basic telecommunication function.

An interface connector 104 is arranged at one side of the microphone 103 and performs a wired data transmission/reception function with an external device or receives the application of an external power source for charging of a battery pack. But, it is not limited to this, and the microphone 103 and the interface connector 104 can be arranged in various positions of the electronic device 100.

Electronic components for sensing for performing various functions of the electronic device 100 are arranged around the speaker 102 of the electronic device 100. As these electronic components, a front camera 105 for video call with a counterpart and a rear camera 107 installed in a rear surface 106 and shooting a subject are installed. Also, sensors 108 for variably operating the electronic device 100 in accordance to the peripheral environment are installed. As these sensors 108, a light sensor for detecting peripheral light and automatically adjusting a brightness of a display in accordance to a detected light value, a proximity sensor or infrared sensor for, when being taken to a user's head portion during a call, sensing this and deactivating the display module 10, or the like can be arranged.

At least one physical key button 20 is arranged to be exposed to the front surface 101 of the electronic device 100. The physical key button 20 can be a home key but it is not limited to this. The physical key button 20 can be a volume up/down button, a wake up button, a power on/off button, and the like. Other various instrumental structures can be mounted in the electronic device 100.

The display module 10 can have a curved shape curved at a constant curvature. Also, the whole electronic device 100 can be formed in a curved shape to have the same or similar curvature with the display module 10 in accordance to the curved shape of the display module 10.

The display module 10 is a touch screen device in which data input/output is performed in the same area. In this case, the display module 10 is a touch screen device including an AMOLED or LCD module and a touch sensor panel. For instance, when the electronic device 100 has a separate object such as a touch pen or stylus pen for data input, the display module 10 can be a concept including even a sensor pad for detecting this. Also, the display module 10 can be a concept including a window protecting the display module 10 outside the electronic device 100.

The display module 10 of the electronic device 100 is extended to a side surface 109 of the electronic device 100 and not only the front surface 101 but also the rear surface 106 of the electronic device 100. In this case, at least a part of the display module 10 is arranged in a shape of surrounding the side surface 109 and rear surface 106 of the electronic device 100 and provides various user interfaces using a side surface 109 area and rear surface 106 area of the display module 10.

The electronic device 100 applies the side surface 109 area of the display module 10 in a rounded shape or applies the side surface 109 area of the display module 10 in a slant shape. But, it is not limited to this, and the shape of the side surface 109 of the display module 10 can be implemented variously.

Figure 3:
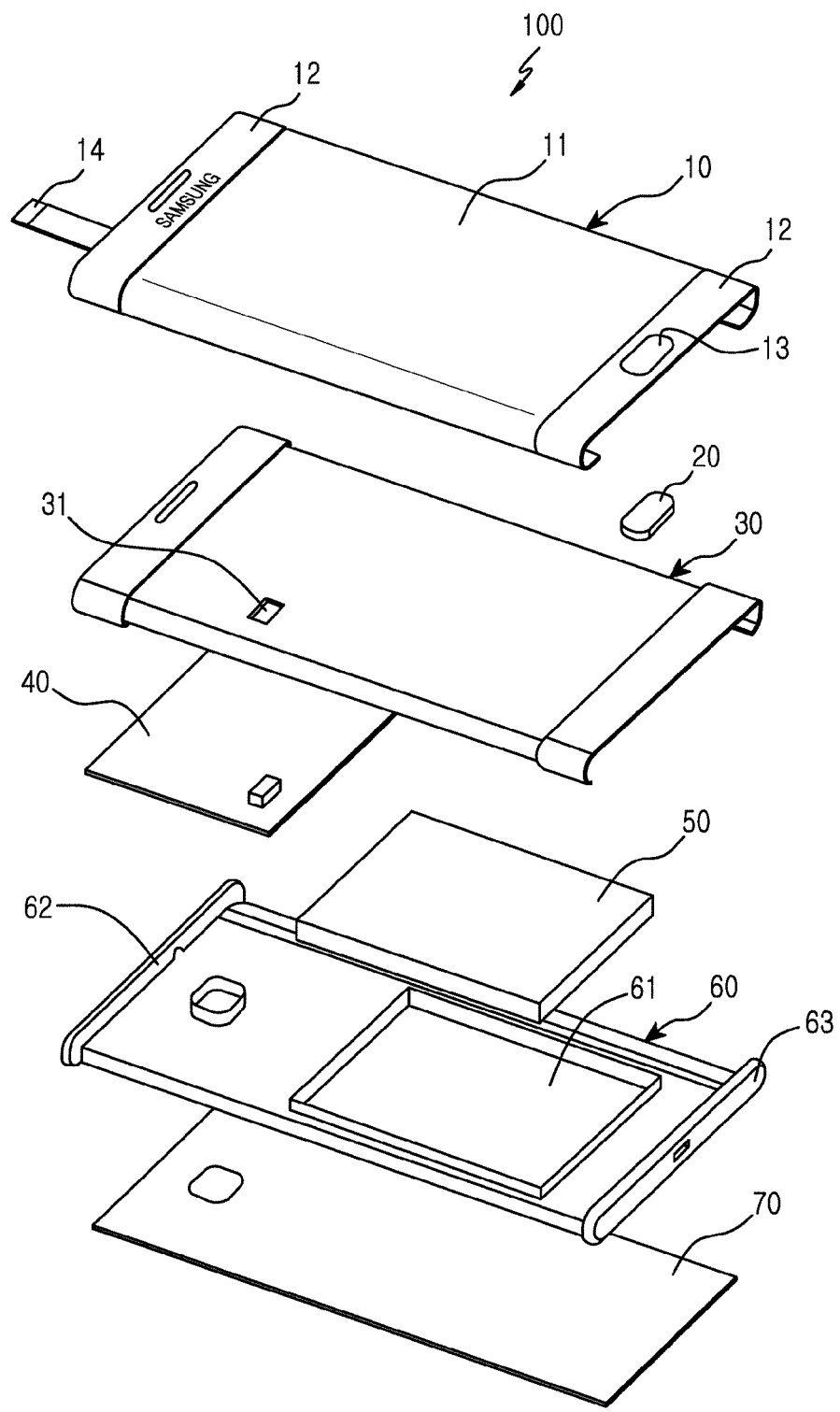
FIG. 3 is an exploded perspective diagram illustrating an example electronic device according to this disclosure.

FIG. 3 is an exploded perspective diagram illustrating an example electronic device 100 according to this disclosure.

Referring to FIG. 3, the electronic device 100 includes the display module 10, the physical key button 20, a bracket 30, a substrate 40, a battery pack 50, a rear cover 60, and a battery cover 70. The substrate 40 can include Printed Circuit Board (PCB) or Printed Wiring Board (PWB).

The display module 10 has a shape corresponding to the bracket 30. The display module 10 includes an active area 11 providing a data input/output function and a non-active area 12 (hereinafter a 'black mask') arranged in an edge. At least one opening 13 for exposing the physical key button 20 to the external is provided at a lower side of the display module 10. Also, the display module 10 includes a connector 14 extended from one side of the display module 10 and providing an electrical signal of the display module 10 to the substrate 40. The connector 14 includes a Flexible Printed Circuit Board (FPCB) or a flexible cable that is electrically connectable with the substrate 40.

At least one surface of the display module 10 is coupled in contact with at least one surface of the bracket 30. For instance, at least a part of the display module 10 is arranged in a way of surrounding an outside surface of the bracket 30.

The display module 10 arranges a window at a top and arranges a flexible display at a bottom. The window of the display module 10 applies a soft-material hard coating film way. For instance, the window of the display module 10 applies diamond guard coating.

The display module 10 can be comprised of a touch screen panel and a flexible display. The touch screen panel can include an Indium Tin Oxide (ITO) and a window. The ITO can be manufactured by applying a Flexible Printed Electronic Film (FPEF) to a PolyEthylene Terephthalate (PET) film. The display module 10 is pliable and can have a constant elasticity.

In an embodiment, the display module 10 has at least one opened side surface while the remnant side surfaces are formed to have a constant curvature. The curvatures of the remnant side surfaces can be the same as one another, but it is not limited to this.

The aforementioned display module 10 can be deformed pliably in general and can apply post-processing such as a heat treatment to keep a specific shape of the display module 10 or fix a part of the display module 10.

The physical key button 20 is fixed to a predetermined position of the bracket 30, and can be exposed to the external through the opening 13 of the display module 10.

The bracket 30 has a shape corresponding to the display module 10. The bracket 30 also has at least one opened side surface while the remnant side surfaces are formed to have a constant curvature.

At least one surface of the bracket 30 is coupled in contact with at least one surface of the display module 10. Also, one surface of the bracket 30 has an opening 31 for connecting the substrate 40 and the display module 10. The connector 14 of the display module 10 is electrically connected with the substrate 40 through the opening 31.

The bracket 30 is formed of metal (such as magnesium (Mg), aluminum (Al). Stainless Steel (STS) and the like) or plastic material of a high hardness, and performs a role of supporting the display module 10.

The substrate 40 includes a main board on which a basic circuit and a plurality of electronic components are mounted. The substrate 40 is housed in an internal housing space of the bracket 30, and is connected with the display module 10 through the opening 31 of the bracket 30.

The substrate 40 performs a function of setting an execution environment of the electronic device 100 and maintaining information thereof, and stably driving the electronic device 100. The substrate 40 is called a Printed Board Assembly (PBA).

The battery pack 50 is electrically connected with the substrate 40 and supplies a power source necessary for the electronic device 100. The battery pack 50 is safely mounted in a battery housing groove 61 of the rear cover 60, and is protected from the external by the battery cover 70.

The rear cover 60 is coupled with the bracket 30. The rear cover 60 includes the battery housing groove 61 for housing the battery pack 50. The rear cover 60 includes side walls 62 and 63 installed at both ends of the rear cover 60, and closing the opened side surfaces of the bracket 30 upon coupling with the bracket 30.

Safe mounting protrusions or grooves for coupling with the rear cover 60 can be provided at a constant interval in one surface of the bracket 30. One surface of the rear cover 60 can include recesses which are provided in a groove form in positions corresponding to the safe mounting protrusions of the bracket 30. Or, the one surface of the rear cover 60 can include safe mounting protrusions which are formed in positions corresponding to recesses provided in the form of the grooves of the bracket 30. The aforementioned safe mounting protrusions or recesses of the bracket 30 are coupled with the recesses or safe mounting protrusions of the rear cover 60. But, it is not limited to this, and the bracket 30 and the rear cover 60 can be coupled using a hook or in various ways such as a fitting way and the like.

The battery cover 70 is arranged in a rear surface of the electronic device 100, and performs a role of protecting a plurality of electronic components and the battery pack 50.

The battery cover 70 is coupled with the rear cover 50 and forms an appearance of the electronic device 100.

A side surface area of the display module 10 of the electronic device 100 is formed in a rounded shape, but it is not limited to this. The side surface area of the display module 10 can be formed in a slant shape. That is, the shape of the side surface area of the display module 10 can be implemented variously.

In an embodiment, constituent elements of the electronic device 100 are illustrated and described, but it is not limited to this. For instance, the electronic device 100 can have more constituent elements than illustrated in the present drawing or have less constituent elements.

An assembly sequence of the electronic device 100 is that the display module 10 is assembled after the aforementioned physical key button 20, the bracket 30, the substrate 40, the battery pack 50, the rear cover 60, and the battery cover 70 are all assembled. For instance, a state of assembling the physical key button 20, the bracket 30, the substrate 40, the battery pack 50, the rear cover 60, and the battery cover 70 will be denoted by a body part (80 of FIG. 4) in the following description.

Figure 4A:
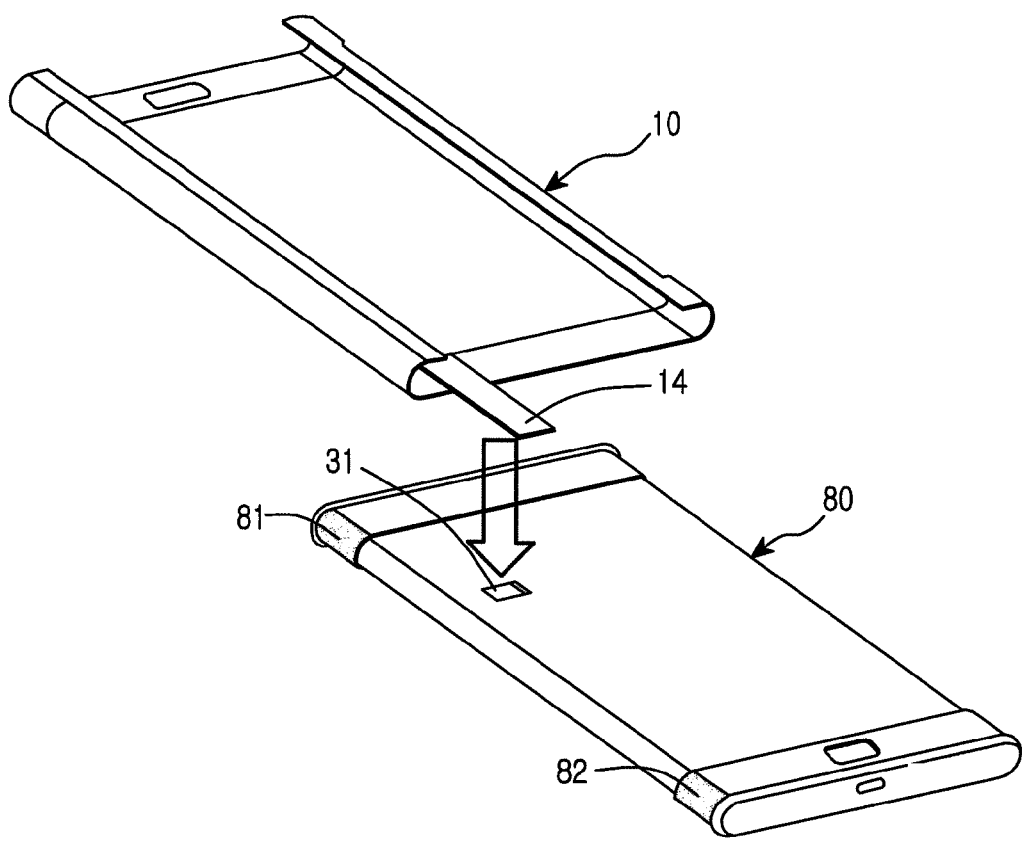
FIG. 4A is an assembly diagram illustrating an example process of electrically connecting a display module to a body part according to this disclosure.
Figure 4B:
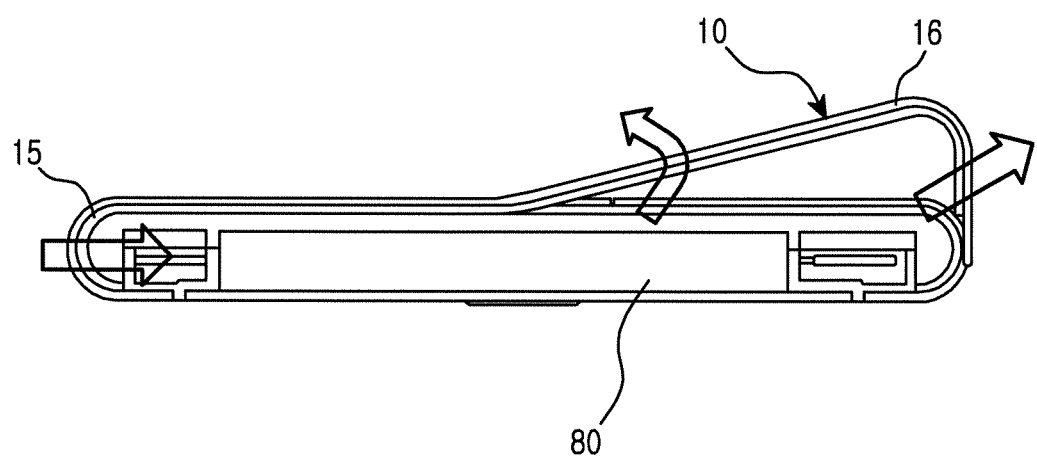
FIG. 4B is an assembly diagram illustrating an example process of fixing one side surface of a display module to one side surface of a body part according to this disclosure.
Figure 4C:
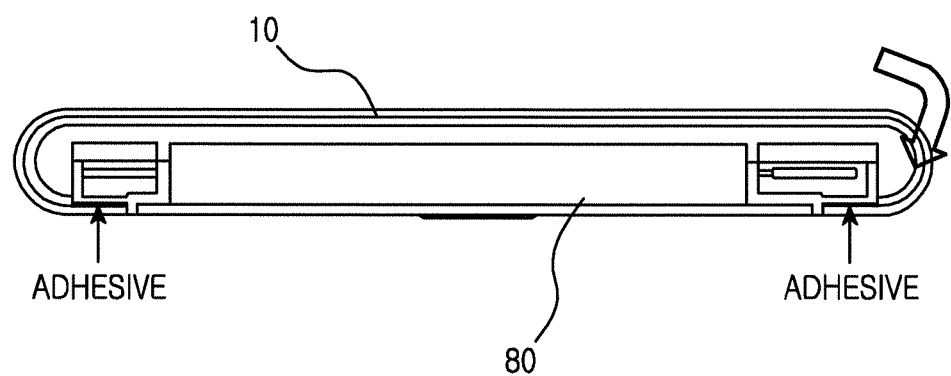
FIG. 4C is an assembly diagram illustrating an example process of fixing the other side surface of a display module to the other side surface of a body part according to this disclosure.

FIGS. 4A to 4C are assembly diagrams for describing an example method of assembling the display module 10 and the body part 80 according to this disclosure.

Referring to FIG. 4A, the display module 10 has a predetermined elasticity, and includes a pliable connector 14 extended from one side of the display module 10.

The body part 80 is an assembled state of the aforementioned constituent elements. An adhesive for coupling with the display module 10 is attached to at least one surface of the body part 80 or the display module 10. This adhesive can be a bond or a tape, but it is not limited to this.

Below, a description is made for a sequence of assembling the display module 10 and the body part 80 according to the present exemplary embodiment.

In a state in which the display module 10 is turned over as in FIG. 4A, the connector 14 of the display module 10 is inserted into the opening 31 of the body part 80. Here, the connector 14 of the display module 10 can be bent because it consists of a FPCB. Next, the connector 14 of the display module 10 is electrically connected with the substrate 40 of the body part 80. The substrate 40 is installed in an internal space of the body part 80 and is connected with the connector 14 of the display module 10 through the opening 31.

The adhesive for fixing the display module 10 can be coated on portions 81 and 82 of a side surface of the body part 80 or at least one portion of the display module 10 before or after the aforementioned assembly process are executed.

After that, as illustrated in FIG. 4B, the display module 10 is fitted to the body part 80 the way an opened side surface of the display module 10 surrounds one portion of the side surface of the body part 80. For instance, after the connector 14 of the display module 10 is coupled, the display module 10 is again turned over and coupled with the body part 80 starting from one side surface 15 of the display module 10 close to the connector 14 of the display module 10. And, the other side surface 16 of the display module 10 is deformed in an outer direction using the elasticity of the display module 10 and then coupled with the opposite side of the body part 80.

After the aforementioned assembly is completed, as illustrated in FIG. 4C, the previously coated adhesive is hardened to finish the assembly of the display module 10 and the body part 80.

FIGS. 5A through 5C illustrates a cross section of an example electronic device 100 according to this disclosure.

FIG. 5A shows a plane diagram of the electronic device 100 completing assembly, and FIG. 5B shows a cross section taken by line A-A from the state FIG. 5A of the electronic device 100, and FIG. 5C shows a cross section taken by line B-B.

Referring to FIG. 5B and FIG. 5C, the display module 10 including a window 17 and a flexible display 18 is arranged outside of the electronic device 100. The window 17 applies a soft-material hard coating film way, or is formed of transparent material having a constant elasticity, thereby being able to have a predetermined elasticity together with the flexible display 18.

The display module 10 can be comprised of a touch screen panel and the flexible display 18. The touch screen panel can include an ITO and the window 17. The ITO can be manufactured by applying a FPEF to a PET film. The display module 10 is pliable and can have a constant elasticity.

The display module 10 is arranged so that the display module 10 surrounds the bracket 30 in contact with at least one surface of the bracket 30. A side surface of the display module 10 and a side surface of the bracket 30 can have a constant curvature, and the curvature of the side surface of the display module 10, and the side surface of the bracket 30 can be equal to each other.

The bracket 30 is coupled with the rear cover 60 and provides a housing space for housing a plurality of electronic components. This housing space arranges the substrate 40 on which a plurality of electronic components are mounted, the battery pack 50, and devices for other additional functions. The battery cover 70 for protecting a rear surface of the electronic device 100 is arranged at a bottom part of the rear cover 60.

The display module 10 has at least one side surface of a rounded shape, and extends to a battery cover 70 area. In this case, the display module 10 is arranged the way the display module 10 surrounds at least one portion of the rear surface of the electronic device 100.

The cross section of the electronic device 100 is illustrated and described, but it is not limited to this. For instance, a plurality of electronic components can be omitted or more added in the present drawing.

FIGS. 6A through 6C illustrate a cross section of an example electronic device 100 according to this disclosure.

FIG. 6A shows a plane diagram of the electronic device 100 completing assembly, and FIG. 6B shows a cross section taken by line A-A from the state FIG. 6A of the electronic device 100, and FIG. 6C shows a cross section taken by line B-B.

Referring to FIG. 6B and FIG. 6C, the display module 10 including a window 17 and a flexible display 18 is arranged outside of the electronic device 100. The window 17 applies a soft-material hard coating film way, or is formed of transparent material having a constant elasticity, thereby being able to have a predetermined elasticity together with the flexible display 18.

The display module 10 can be comprised of a touch screen panel and the flexible display 18. The touch screen panel can include an ITO and the window 17. The ITO can be manufactured by applying a FPEF to a PET film. The display module 10 is pliable and can have a constant elasticity.

The display module 10 is arranged so that the display module 10 surrounds the bracket 30 in contact with at least one surface of the bracket 30. A front surface and side surface of the display module 10 and a front surface and side surface of the bracket 30 can have a constant slant. This shape can be a trapezoid form, but it is not limited to this.

The bracket 30 is coupled with the rear cover 60 and provides a housing space for housing a plurality of electronic components. This housing space arranges the substrate 40 on which a plurality of electronic components are mounted, the battery pack 50, and devices for other additional functions. The battery cover 70 for protecting a rear surface of the electronic device 100 is arranged at a bottom part of the rear cover 60.

The display module 10 includes at least one side surface of a slant shape, and extends to a battery cover 70 area. In this case, the display module 10 is arranged the way the display module 10 surrounds at least one portion of the rear surface of the electronic device 100.

The cross section of the electronic device 100 is illustrated and described, but it is not limited to this. For instance, a plurality of electronic components can be omitted or more added in the present drawing.

Figure 7:
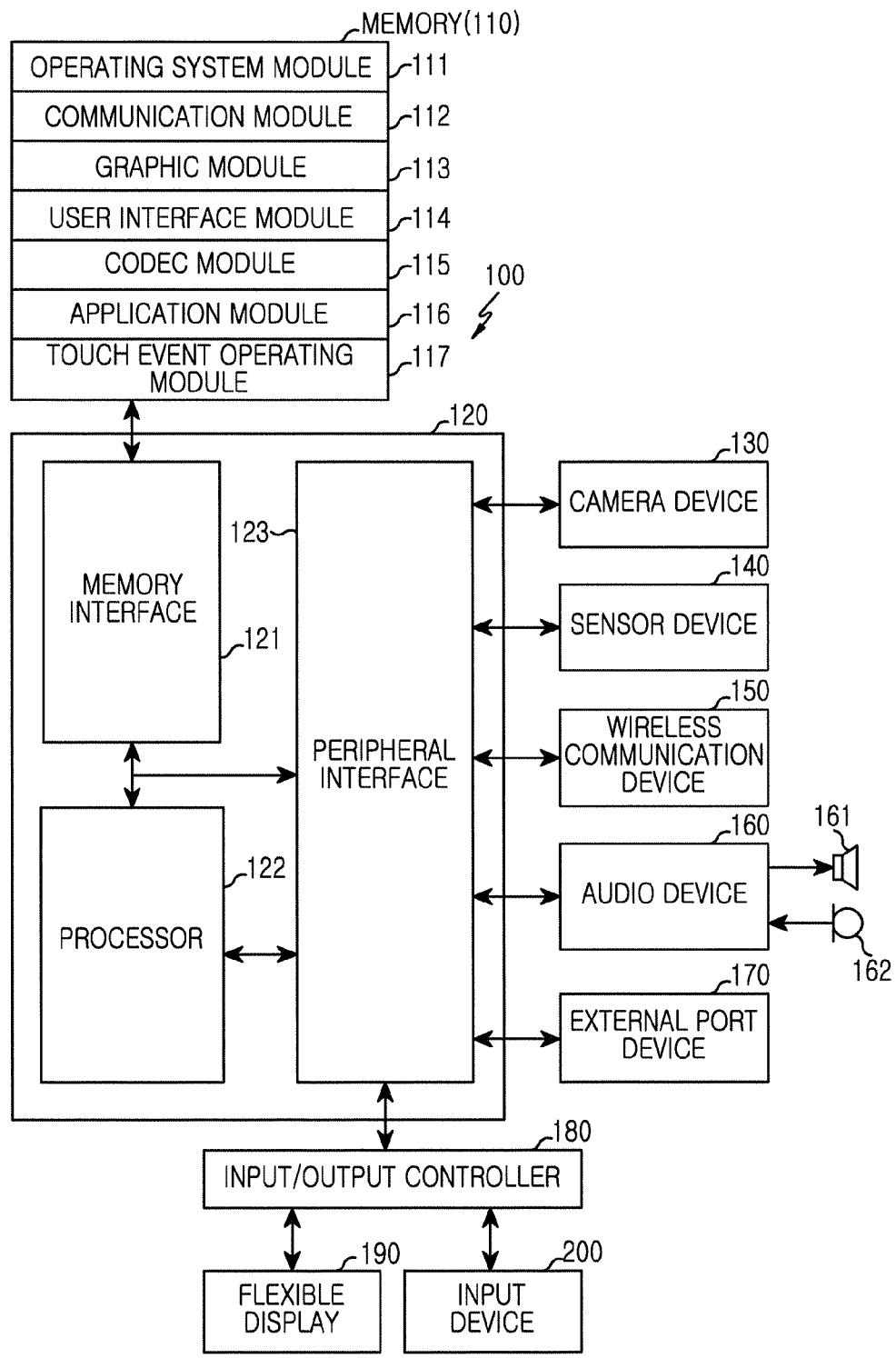
FIG. 7 is a block diagram illustrating a construction of an example electronic device according to this disclosure.

FIG. 7 is a block diagram illustrating a construction of the electronic device 100 according to one exemplary embodiment of the present disclosure.

Referring to FIG. 7, the electronic device 100 is a device such as a Personal Digital Assistant (PDA), a laptop computer, a mobile phone, a smart phone, a netbook, a handheld computer, a Mobile Internet Device (MID), a media player, a Ultra Mobile PC (UMPC), a tablet computer, a notebook PC, a wrist watch, a navigator, an MPEG Audio Layer 3 (MP3) player, a camera device or a wearable device. Also, the electronic device 100 may be any device including a device combining two or more functions among these devices.

The electronic device 100 includes a memory 110, a processor unit 120, a camera device 130, a sensor device 140, a wireless communication device 150, an audio device 160, an external port device 170, an input/output control unit 180, a flexible display 190, and an input device 200. The memory 110 and the external port device 170 can be constructed in plural.

Each constituent element is described as follows.

The processor unit 120 includes a memory interface 121, at least one processor 122, and a peripheral interface 123. Here, the memory interface 121, the at least one processor 122 and the peripheral interface 123 included in the processor unit 120 is integrated as at least one integrated circuit or be implemented as separate constituent elements.

The memory interface 121 controls the access of the constituent element such as the processor 122 or the peripheral interface 123 to the memory 110.

The peripheral interface 123 controls the connection of the memory interface 121 and the processor 122 with an input/output peripheral device of the electronic device 100.

The processor 122 controls the electronic device 100 to provide various multimedia services, using at least one software program. The processor 122 executes at least one program stored in the memory 110 and provides a service corresponding to the corresponding program.

The processor 122 executes several software programs and performs several functions for the electronic device 100, and performs processing and control for voice communication, video communication and data communication. Further, the processor 122 interworks with software modules stored in the memory 110 and performs methods of exemplary embodiments of the present disclosure.

The processor 122 confirms a touch event to at least one surface among a side surface and rear surface of the electronic device 100 and controls to perform at least one function corresponding to the confirmed touch event.

The processor 122 can include one or more data processors, image processors, or CODECs. Further, the electronic device 100 can separately construct the data processor, the image processor, or the CODEC.

The processor 122 can include one or more Application Processors (APs) or one or more Communication Processors (CPs).

Various constituent elements of the electronic device 100 can be connected through one or more communication buses or electrical connection means.

The camera device 130 performs a camera function such as photo, video clip, recording and the like. The camera device 130 can include a Charged Coupled Device (CCD), a Complementary Metal-Oxide Semiconductor (CMOS) or the like. Further, the camera device 130 can perform hardware construction change, for instance, lens shift, iris count adjustment, and the like in accordance with a camera program executed by the processor 122.

The camera device 130 provides a collected image acquired by shooting a subject to the processor unit 120. The camera device 130 can include an image sensor for converting an optical signal into an electrical signal, an image signal processor for converting an analog image signal into a digital image signal, a digital signal processor for processing the digital image signal outputted from the image signal processor into an image to display the image on the flexible display 190, and the like. The camera device 130 can include an actuator moving a lens, a driver Integrated Circuit (IC) driving the actuator, and the like.

The sensor device 140 can include a proximity sensor, a hall sensor, a light sensor, a motion sensor, and the like. For example, the proximity sensor senses an object approaching the electronic device 100, and the hall sensor senses a magnetic force of a metal body. Also, the light sensor senses light around the electronic device 100. The motion sensor includes an acceleration sensor or gyro sensor sensing a motion of the electronic device 100. But, it is not limited to this, and the sensor device 140 can further include various sensors for implementing the known other additional functions.

The wireless communication device 150 makes possible wireless communication and includes a wireless frequency transmitter/receiver or an optical (such as infrared) transmitter/receiver. The wireless communication device 150 can include a Radio Frequency (RF) IC unit and a baseband processor. The RF IC unit can transmit/receive an electromagnetic wave and can convert a baseband signal from the baseband processor into an electromagnetic wave and transmit the electromagnetic wave through an antenna.

The RF IC unit includes an RF transceiver, an amplifier, a tuner, an oscillator, a digital signal processor, a CODEC chipset, a Subscriber Identification Module (SIM) card, and the like.

The wireless communication device 150 is implemented to operate through at least one of a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a Wireless Fidelity (Wi-Fi) network, a Wireless interoperability for Microwave Access (WiMAX) network, and a Bluetooth network in accordance to a communication network. But, it is not limited to this, and the wireless communication device 150 applies several communication methods using an electronic mail (e-mail), instant messaging, or Short Message Service (SMS) protocol.

The audio device 160 is connected to the speaker 161 and the microphone 162 and performs an audio input and output function of voice recognition, voice replication, digital recording, a call function or the like. The audio device 160 provides an audio interface between a user and the electronic device 100 and converts a data signal received from the processor 122 into an electrical signal and outputs the converted electrical signal through the speaker 161.

The speaker 161 converts an electrical signal into an audible frequency band and outputs the audio frequency band. The speaker 161 is arranged in front or rear of the electronic device 100. The speaker 161 includes a flexible film speaker attaching at least one piezoelectric body to one vibration film.

The microphone 162 converts a sound wave forwarded from human or other sound sources into an electrical signal. The audio device 160 receives the electrical signal from the microphone 162, converts the received electrical signal into an audio data signal, and transmits the converted audio data signal to the processor 122. The audio device 160 can include an earphone, an earset, a headphone or a headset which is attachable to or detachable from the electronic device 100.

The external port device 170 directly connects the electronic device 100 with a counterpart electronic device, or indirectly connects the electronic device 100 with the counterpart electronic device through a network (such as the internet, an intranet, a wireless LAN and the like). The external port device 170 can include a Universal Serial Bus (USB) port, a FIREWIRE port or the like.

The input/output control unit 180 provides an interface between an input/output device such as the flexible display 190, the input device 200 and the like and the peripheral interface 123. The input/output control unit 180 includes a flexible display controller and other input device controller.

The flexible display 190 provides an input and output interface between the electronic device 100 and a user. The flexible display 190 applies a touch sensing technology to forward user's touch information to the processor 122 and shows visual information, a text, a graphic, a video or the like provided from the processor 122 to the user.

The flexible display 190 can display state information of the electronic device 100, a text inputted by a user, a moving picture, and a still picture. Further, the flexible display 190 can display information related to an application driven by the processor 122.

The flexible display 190 extends to a side surface of the electronic device 100 or a rear surface of the electronic device 100 through the side surface, and senses a touch event inputted through the side surface and rear surface of the electronic device 100.

The input device 200 provides input data generated by user's selection to the processor 122 through the input/output control unit 180. The input device 200 includes a keypad including at least one hardware button and a touch pad sensing touch information.

The input device 200 includes an up/down button for volume control. Besides this, the input device 200 includes at least one of a push button assigned a corresponding function, a locker button, a rocker switch, a thumb-wheel, a dial, a stick, a mouse, a track ball, a pointer device such as a stylus, and the like.

The memory 110 includes one or more high-speed random access memories or non-volatile memories such as magnetic disk storage devices, one or more optical storage devices or flash memories (for example, Not AND (NAND) memories, Not OR (NOR) memories).

The memory 110 stores software. This software can include an operating system module 111, a communication module 112, a graphic module 113, a user interface module 114, a CODEC module 115, an application module 116, and a touch event operating module 117. The term of module can be expressed as a set of instructions, an instruction set, or a program.

The operating system module 111 can include an embedded operating system such as WINDOWS, LINUX, Darwin, RTXC, UNIX, OS X, Android or VxWorks, and can include various software constituent elements controlling general system operation. Control of the general system operation can include memory control and management, storage hardware (device) control and management, power control and management, and the like. Further, the operating system module 111 can perform a function of making smooth communication between various hardware (devices) and software constituent elements (modules).

The communication module 112 makes possible communication with a counterpart electronic device such as a computer, a server, an electronic device and the like, through the wireless communication device 150 or the external port device 170.

The graphic module 113 includes various software constituent elements for providing and displaying a graphic on the flexible display 190. The term of graphic can signify a text, a web page, an icon, a digital image, a video, an animation and the like.

The user interface module 114 includes various software constituent elements associated with a user interface. The user interface module 114 controls to display on the flexible display 190 information related to an application driven by the processor 122. Also, the user interface module 114 can include information about how a state of a user interface is changed, whether the change of the state of the user interface is carried out in which condition, or the like.

The CODEC module 115 includes a software constituent element related to encoding and decoding of a video file.

The application module 116 includes a software constituent element for at least one application installed in the electronic device 100. This application can include a browser, an e-mail, a phonebook, a game, a short message service, a multimedia message service, a Social Networking Service (SNS), an instant message, a wake-up call. MP3, schedule management, a paint, a camera, word processing, keyboard emulation, a music player, a video player, an address book, a touch list, a widget, Digital Right Management (DRM), voice recognition, voice replication, a position determining function, a location-based service, a user authentication service, and the like. The term of application is expressed as an application program as well.

The touch event operating module 117 confirms a touch event to at least one surface among a side surface and rear surface of the electronic device 100 and performs at least one function corresponding to the confirmed touch event. The touch event operating module 117 can include various processes which are executed in accordance to a method of gripping the electronic device 100.

The processor unit 120 can further include additional modules (instructions) besides the aforementioned modules.

Various functions of the electronic device 100 can be executed by hardware or software including one or more processing or Application Specific Integrated Circuits (ASICs).

The electronic device 100 includes a power system for supplying a power source to several constituent elements included in the electronic device 100. The power system can include a power source (such as an alternating current or a battery), a power error detection circuit, a power converter, a power inverter, a charging device, or a power level indicating device (such as a light emitting diode). Further, the electronic device 100 can include a power management and control device performing a power generation, management and distribution function.

In the present exemplary embodiment the constituent elements of the electronic device 100 are illustrated and described, but it is not limited to this. For example, the electronic device 100 can have more constituent elements than illustrated in the present drawing or less constituent elements.

Figures 8A, 8B:
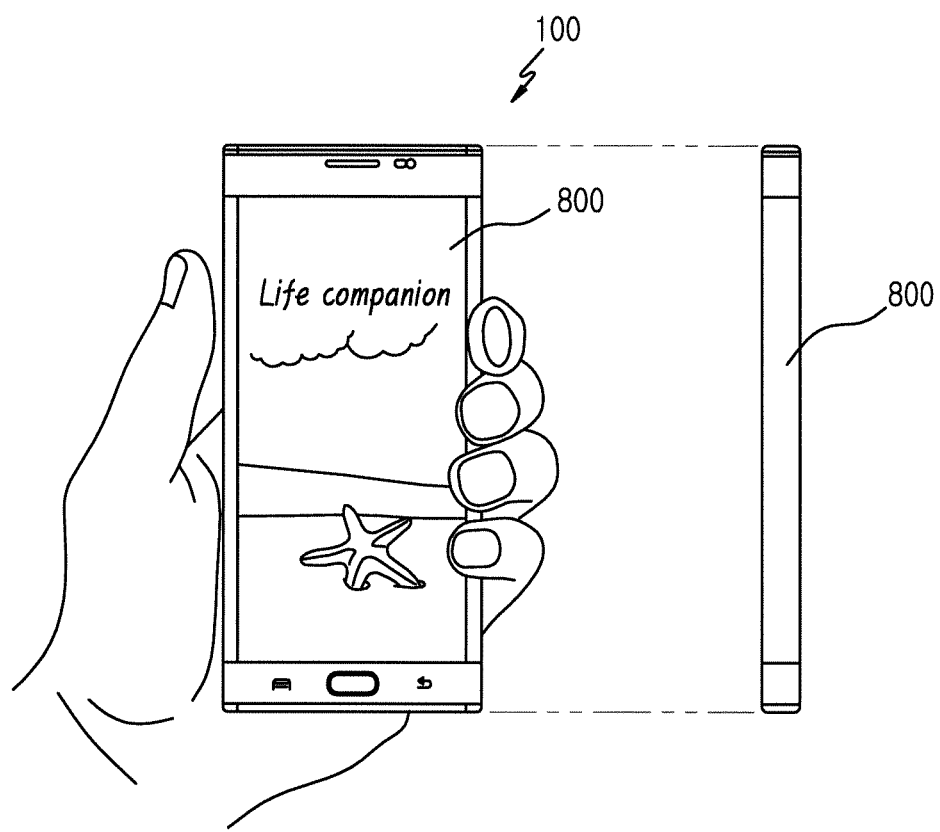
FIGS. 8A and 8B are diagrams illustrating a state of holding an example electronic device with one hand according to this disclosure.
Figure 9:
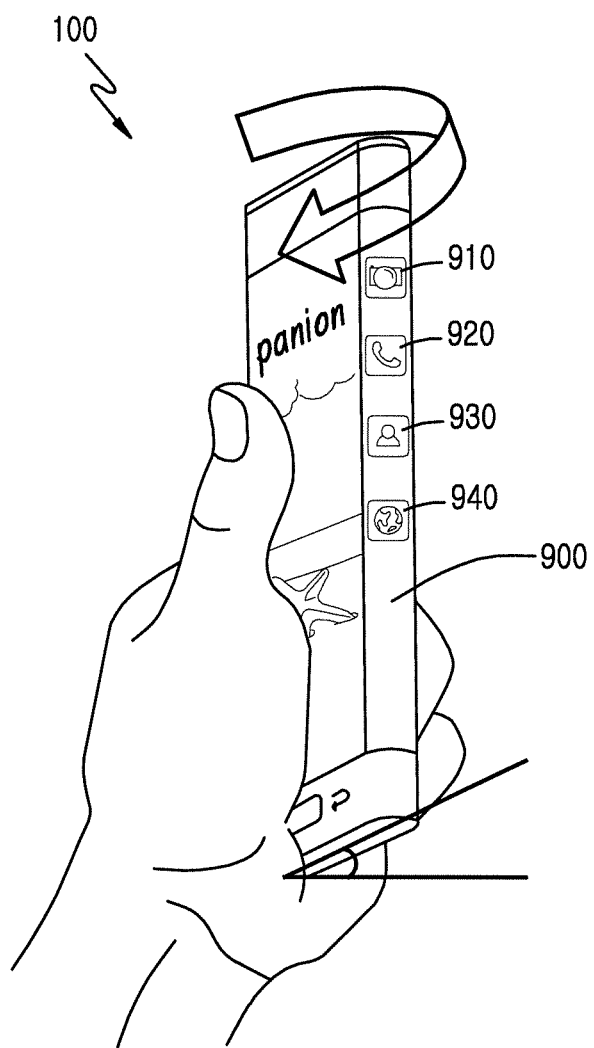
FIG. 9 is a diagram illustrating an example state of rotating an electronic device by a constant angle after holding the electronic device with one hand according to this disclosure.

FIGS. 8A, 8B, and 9 are diagrams for describing an example operation method of the electronic device 100 according to this disclosure.

FIG. 8A shows a diagram illustrating a state in which a user grips the electronic device 100 and FIG. 8B shows a side view of the electronic device 100 illustrated in FIG. 8A.

Referring to FIGS. 8A and 8B, the electronic device 100 include a display module 800 extended to a side surface of the electronic device 100 or a rear surface of the electronic device 100 through the side surface. This display module 800 applies a touch pad to receive a touch input by an input means such as a finger or a touch pen.

The electronic device 100 displays a text and an image by a graphic through a front surface of the display module 800. Also, the side surface of the display module 800 can have a rounded shape and various objects can be displayed on the side surface of the display module 800 in accordance to a user's grip form. For instance, if a user uses the front surface of the display module 800, the side surface of the display module 800 operate as a bezel area, and a touch input coordinate value according to user's grip is detected through the side surface of the display module 800.

As illustrated in FIG. 9, if a user rotates the electronic device 100 by a constant angle with respect to a Y axis of the electronic device 100 with gripping the electronic device 100 with one hand, a plurality of objects 910, 920, 930, and 940 can be displayed at a constant interval or in a specific area on a side surface 900 of the electronic device 100.

In another exemplary embodiment, if the user rotates the electronic device 100 by a constant angle with respect to the Y axis of the electronic device 100 with gripping the electronic device 100 with one hand, additional information about objects such as an image, contents, a text, a video and the like displayed on a front surface of the electronic device 100 is displayed on the side surface 900 of the electronic device 100. This additional information can include additional function information about the object, attribute information, setting information, or the like, but it is not limited to this.

In a state where the electronic device 100 does not sense a touch to the right side surface 900 of the electronic device 100, the electronic device 100 senses a surface touch to a left side surface of the electronic device 100 and a rotation of the electronic device 100 and performs a function of displaying on the right side surface 900 of the electronic device 100. For instance, if the rotation of the electronic device 100 is sensed, front main display can be off or dimmed.

A user can set to change positions or areas of the objects 910, 920, 930 and 940. These objects 910, 920, 930, and 940 can include widget icons according to user setting, and program display icons. Also, the objects 910, 920, 930 and 940 can further include shortcut icons executable by the user, but it is not limited to this.

As discussed herein, the description has been made for a case (such as a left grip basis) where a user grips the electronic device 100 with a left hand, but it is not limited to this. For instance, when the user grips the electronic device 100 with a right hand, the aforementioned objects 910, 920, 930, and 940 are displayed on a left side surface of the electronic device 100. Also, the aforementioned display function is executed by various gestures, and these gestures can be set by the user.

Figure 10:
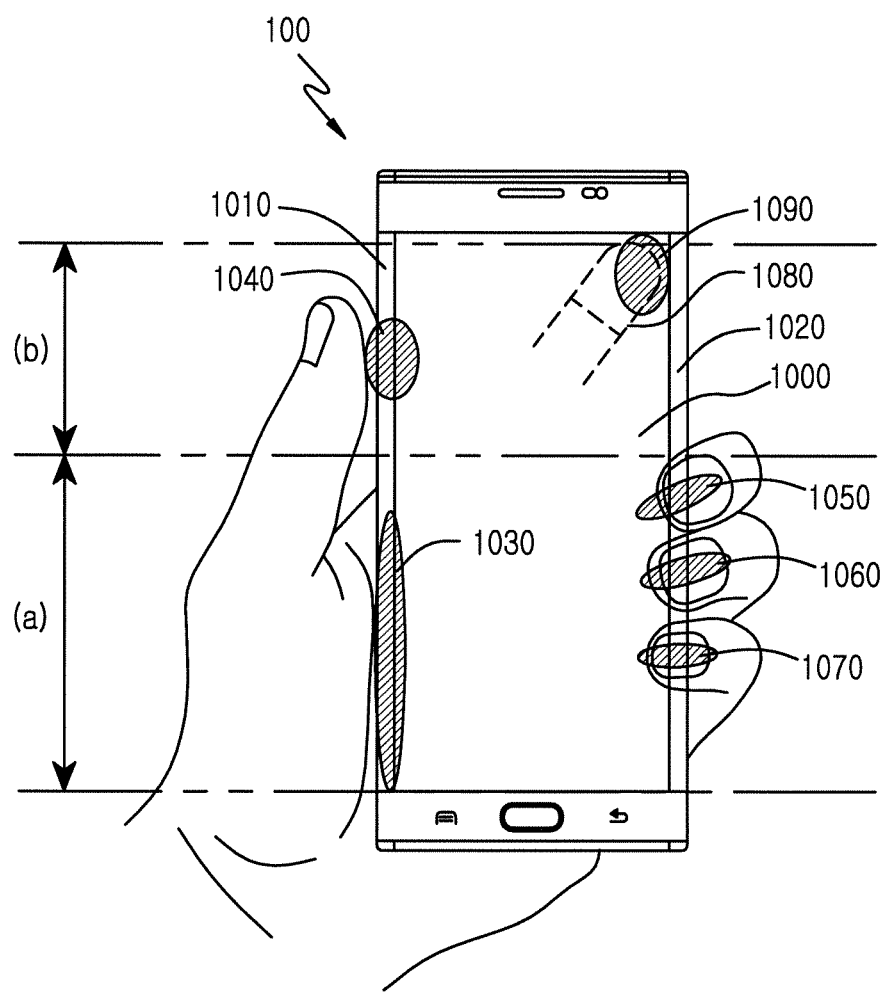
FIG. 10 is a diagram for describing an example locking area and an example function area of an electronic device according to this disclosure.
Figure 11:
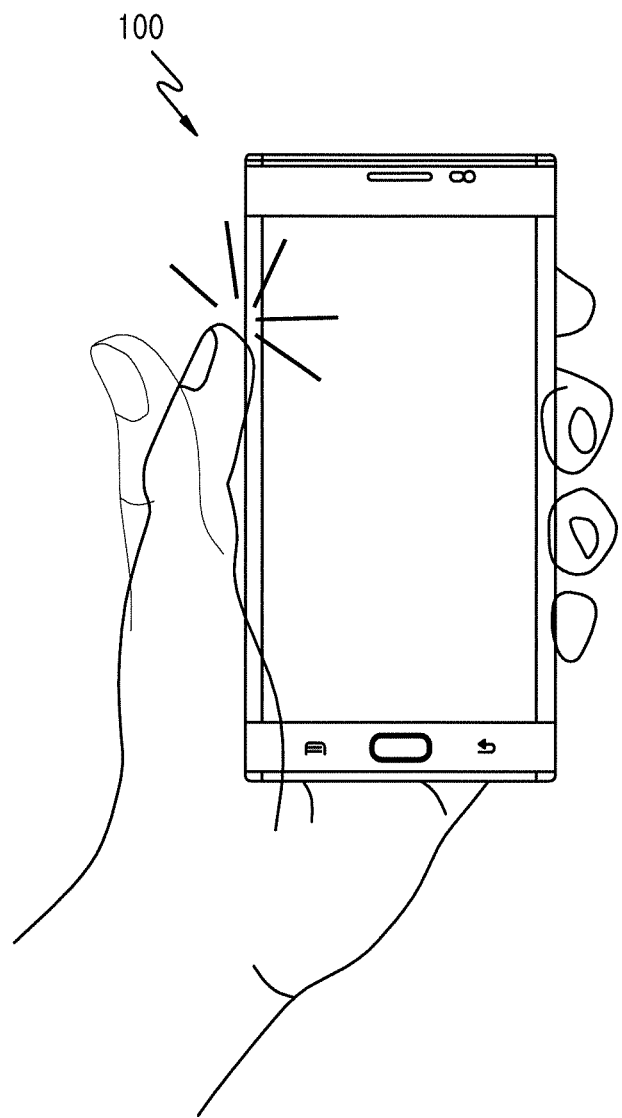
FIG. 11 is a diagram for describing an example gesture for executing a specific function in an electronic device according to this disclosure.

FIGS. 10 and 11 are diagrams for describing an example method of the electronic device 100 according to this disclosure.

FIG. 10 illustrates a state in which a user grips the electronic device 100 with one hand. Referring to FIG. 10, the electronic device 100 includes a display module 1000 extended to side surfaces 1010 and 1020 of the electronic device 100 or a rear surface of the electronic device 100 through the side surfaces 1010 and 1020. This display module 1000 applies a touch pad to receive a touch input by an input means such as a finger or a touch pen.

The electronic device 100 confirms respective touches to the left side surface 1010, right side surface 1020, and rear surface of the electronic device 100. For instance, the electronic device 100 senses a palm touch 1030 and a thumb touch 1040 to the left side surface 1010 of the electronic device 100. Also, the electronic device 100 senses finger touches 1050, 1060, and 1070 to the right side surface 1020 of the electronic device 100.

In an embodiment, by detecting a touch area for each touch, the electronic device 100 determines if the touch is the finger touch or the palm touch. For example, by determining whether the palm touch 1030 has been sensed on which side surface, the electronic device 100 determines whether the electronic device 100 has been gripped with a left hand or has been gripped with a right hand.

The electronic device 100 sets a locking area (a) to the side surfaces 1010 and 1020 and rear surface of the electronic device 100. The locking area (a) is set by an input of the palm touch 1030 and the finger touches 1050, 1060, and 1070 which are touched when a user grips the electronic device 100 with one hand as in FIG. 10. For example, when at least one surface touch 1030 and at least two or more discontinuous point touches 1050 1060, and 1070 are inputted, the locking area (a) ranges from a horizontal line of the uppermost coordinate value of a surface touch 1030 area to a lower area of the left side surface 1010 and rear surface of the electronic device 100. For another example, when at least one surface touch 1030 and at least two or more discontinuous point touches 1050, 1060, and 1070 are inputted, the locking area (a) ranges from a horizontal line of a coordinate value of the uppermost point touch 1050 among the at least two or more discontinuous point touches 1050, 1060 and 1070 to a lower area of the right side surface 1020 and rear surface of the electronic device 100.

The electronic device 100 sets a function area (b) to the side surfaces 1010 and 1020 and rear surface of the electronic device 100. The function area (b) receives a touch event 1090 by a thumb finger or an index finger 1080 in a state in which a user grips the electronic device 100 with one hand as in FIG. 10. The electronic device 100 executes a corresponding function in accordance to the touch event 1090 of the function area (b). This function can include, for example, a function of increasing or decreasing a sound volume of the electronic device 100, a function of zooming in or zooming out at a constant rate an object displayed on a screen, a function of canceling or again performing the latest executed instruction, a function of scrolling for quick screen conversion, a function of executing a specific application, and the like, but it is not limited to this.

The electronic device 100 activates or deactivates a function executed through the function area (b) in a state of setting the aforementioned locking area (a). For example, the electronic device 100 activates or deactivates the aforementioned functions through a double tap operation by the thumb or a touch and drag operation by the thumb as in FIG. 11. But, it is not limited to this, and a gesture for activating the function executed through the function area (b) can be variously set by a user.

In the present exemplary embodiment, the description has been made for a case (such as a left grip basis) where a user grips the electronic device 100 with a left hand, but it is not limited to this. For example, the electronic device 100 can be constructed to execute the present exemplary embodiment even when the user grips the electronic device 100 with a right hand.

Figure 12A:
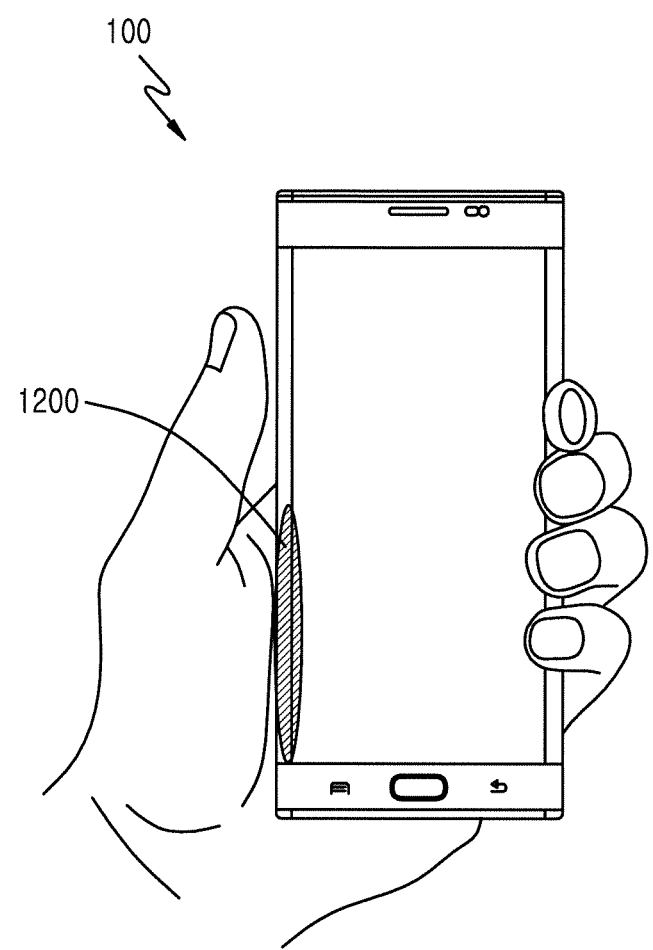
FIG. 12A is a diagram illustrating an example state of holding an electronic device with one hand according to this disclosure.
Figure 12B:
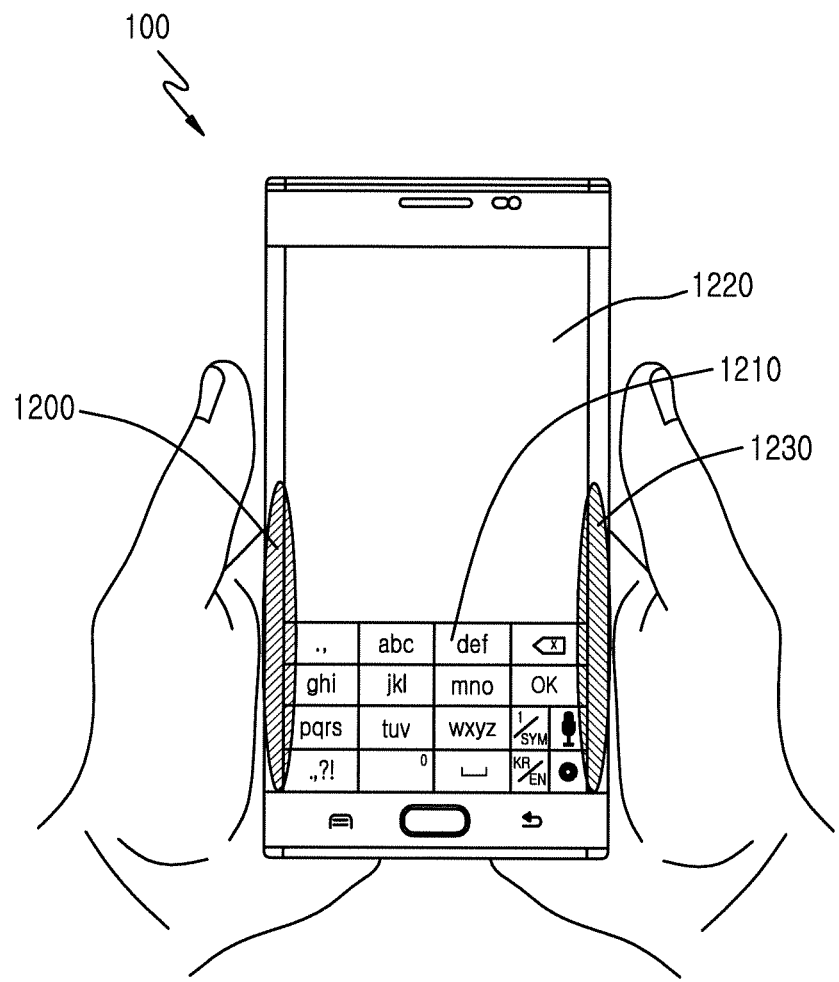
FIG. 12B is a diagram illustrating an example state of holding an electronic device with two hands according to this disclosure.

FIGS. 12A and 12B are diagrams for describing an example operation method of the electronic device 100 according to this disclosure.

Referring to FIG. 12A, a user grips the electronic device 100 with one hand (such as a left hand or a right hand). In this case, the electronic device 100 senses a palm touch 1200 to a left side surface of the electronic device 100.

When the user grips the electronic device 100 with two hands, not one hand, as in FIG. 12B, the electronic device 100 recognizes this as a gesture for text input, and displays a key pad 1210 on a screen 1220. For example, if the electronic device 100 concurrently senses a palm touch 1200 to a left side surface of the electronic device 100 and a palm touch 1230 to a right side surface of the electronic device 100, the electronic device 100 outputs a preset at least one object to the screen 1220. But, it is not limited to this, and the electronic device 100 can execute various contents or a specific application set by the user as well as the keypad 1210.

Figure 13:
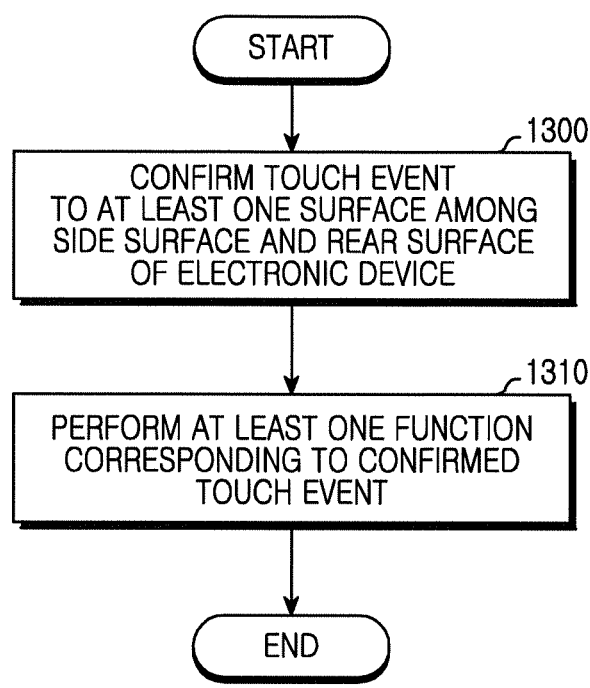
FIG. 13 is a flowchart illustrating an example operation method of an electronic device according to this disclosure.

FIG. 13 is a flowchart illustrating an example method of the electronic device 100 according to this disclosure.

The electronic device 100 includes a display module extended to a side surface of the electronic device 100 or a rear surface of the electronic device 100 through the side surface. This display module applies a touch pad to receive a touch input by an input means such as a finger or a touch pen.

Referring to FIG. 13, in operation 1300, the electronic device 100 confirms a touch event to at least one surface among a side surface and rear surface of the electronic device 100.

The touch event can include any one operation among a flicking operation, a touch and drag operation, a tap and hold operation, and a multi tap operation for at least one surface among the side surface and rear surface of the electronic device 100. But, it is not limited to this, and the touch event can be variously set by a user.

In operation 1310, the electronic device 100 performs at least one function corresponding to the confirmed touch event.

The function executed in accordance to the touch event can include a function of increasing or decreasing a sound volume of the electronic device 100, a function of zooming in or zooming out at a constant rate an object displayed on a screen, a function of canceling or again performing the latest executed instruction, a function of scrolling for quick screen conversion, a function of executing a specific application and the like, but it is not limited to this. For example, the function corresponding to this touch event is directly set by the user.

An instruction set for this each operation is stored as one or more modules in the aforementioned memory 110. In this case, the module stored in the memory 110 can be executed by one or more processors 122.

Methods according to this disclosure can be implemented in a form of hardware, software, or a combination of hardware and software.

When the methods are implemented by the software, a computer-readable storage medium storing one or more programs (such as software modules) can be provided. The one or more programs stored in the computer-readable storage medium are configured to be executed by one or more processors within an electronic device. The one or more programs can include instructions for enabling the electronic device to execute the methods according to the exemplary embodiments stated in the claims and/or specification of the present disclosure.

These programs (such as software modules or software) can be stored in a Random Access Memory (RAM), a nonvolatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of other form, and a magnetic cassette. Or, the programs can be stored in a memory constructed by a combination of some or all of them. Also, each constructed memory may be included in plural.

Also, the programs can be stored in an attachable storage device accessible to the electronic device through a communication network such as the Internet, an intranet, a Local Area Network (LAN), a Wireless LAN (WLAN) and a Storage Area Network (SAN) or a communication network constructed by a combination of them. This storage device can access the electronic device through an external port.

Also, a separate storage device on the communication network can access a portable electronic device.

The aforementioned various exemplary embodiments can provide an excellent acknowledgement quality and grip sense, and provide an intuitive user interface using a side surface and rear surface of an electronic device.

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. An electronic device comprising:
  a display module including a window at a top and a flexible display module at a bottom;
  a bracket supporting the flexible display module, wherein the bracket includes a front surface, a first side surface to extend from the front surface, a rear surface to extend from the first side surface, and a second side surface to extend from the front surface opposite the first side surface, wherein the first side surface and the second side surface formed with a curvature equal to a curvature of the flexible display module; and
  the flexible display module including a curvature and formed to surround the front surface, the first side surface, and a part of the rear surface of the bracket,
  wherein a first side of the flexible display module is coupled to the first side surface of the bracket and a second side of the flexible display module is temporarily deformed in order to couple with the second side surface of the bracket,
wherein the window is applied as a soft-material hard coating film.

2. The electronic device of claim 1, wherein a touch panel is disposed between the window and the flexible display module.

3. The electronic device of claim 1, wherein the window is wider than the flexible display module.

4. The electronic device of claim 1, wherein the bracket is formed of at least one of a metal material and a plastic material.

5. The electronic device of claim 1, wherein at least one surface among a front surface, a side surface, and a rear surface of the electronic device includes a slant shape.

6. The electronic device of claim 1, wherein the flexible display module is coupled with the bracket to provide an internal housing space housing a plurality of electronic components.

7. A method for assembling an electronic device, the method comprising:
forming a display module including a window at a top and a flexible display module at a bottom;
forming the flexible display module that includes a curvature;
electrically connecting the flexible display module to a body part of the electronic device, wherein the body part includes a front surface, a first side surface to extend from the front surface, a rear surface to extend from the first side surface, and a second side surface to extend from the front surface opposite the first side surface, wherein the first side surface and the second side surface formed with a curvature equal to a curvature of the flexible display module;
attaching the flexible display module to the first side surface of the body part; and
temporarily deforming a second side of the flexible display module in order to couple with the second side surface of the body part,
wherein the window is applied as a soft-material hard coating film.

8. The method of claim 7, wherein electrically connecting the flexible display module to the body part of the electronic device comprises coupling a connector extended from the flexible display module in one direction with a part of a substrate of the body part of the electronic device.

9. The method of claim 8, wherein the connector is formed as a Flexible Printed Circuit Board (FPCB).

10. A method of an electronic device having a display module including a window at a top and a flexible display module at a bottom, the method comprising:
detecting a plurality of touches on the flexible display module corresponding to a grip of the electronic device, wherein the flexible display module is formed to surround a front surface of a body part of the electronic device, at least one side surface to extend from the front surface, and at least a part of a rear surface of the electronic device to extend from the at least one side surface, wherein a first side of the flexible display module is coupled to a first side surface of the body part and a second side of the flexible display module is temporarily deformed in order to couple with a second side surface of the body part;
setting a locking area and a function area on the side surface and the rear surface based on the touches;
detecting a touch on the function area; and
performing at least one function corresponding to the detected touch,
wherein the window is applied as a soft-material hard coating film.

11. The method of claim 10, further comprising:
deciding if the electronic device rotates by a reference angle; and
displaying additional information on at least a part of the side surface if the electronic device rotates by the reference angle.

12. The method of claim 11, wherein the additional information comprises at least one of additional function information, attribute information, and setting information about an object displayed on a front surface of the electronic device.

13. The method of claim 12, wherein the at least one function corresponding to the touch comprises at least one of a function of increasing or decreasing a sound volume of the electronic device, a function of zooming in or zooming out at a constant rate an object displayed on a screen, a function of canceling or again performing a latest executed instruction, a function of scrolling for quick screen conversion, and a function of executing a specific application.

14. An electronic device comprising:
a display module including a window at a top and a flexible display module at a bottom;
a bracket supporting the flexible display module, wherein the bracket includes a front surface, a first side surface to extend from the front surface, a rear surface to extend from the first side surface, and a second side surface to extend from the front surface opposite the first side surface, wherein the first side surface and the second side surface formed with a curvature equal to a curvature of the flexible display module;
the flexible display module formed to surround the front surface, the first side surface, and a part of the rear surface of the bracket, wherein a first side of the flexible display module is coupled to the first side surface of the bracket and a second side of the flexible display module is temporarily deformed in order to couple with the second side surface of the bracket;
a memory; and
at least one processor configured to:
detect a plurality of touches on the flexible display module corresponding to a grip of the electronic device,
set a locking area and a function area on the first side surface and the rear surface based on the touches,
detect a touch on the function area, and
perform at least one function corresponding to the detected touch,
wherein the window is applied as a soft-material hard coating film.

15. The electronic device of claim 14, wherein the processor is configured to:
decide if the electronic device rotates by a reference angle; and
display additional information on at least a part of the side surface if the electronic device rotates by the reference angle.

16. The electronic device of claim 15, wherein the additional information comprises at least one of additional function information, attribute information, and setting information about an object displayed on a front surface of the electronic device.

17. The electronic device of claim 16, wherein the processor is configured to perform, in response to the touch, at least one function among a function of increasing or decreasing a sound volume of the electronic device, a function of zooming in or zooming out at a constant rate an object displayed on a screen, a function of canceling or again performing a latest executed instruction, a function of scrolling for quick screen conversion, and a function of executing a specific application.

\* \* \* \* \*